(12) United States Patent
Tang et al.

(10) Patent No.: US 6,392,864 B1
(45) Date of Patent: May 21, 2002

(54) ELECTRICAL DRIVER CIRCUIT FOR DIRECT ACTING CANTILEVER SOLENOID VALVE

(75) Inventors: Jing Tang, Strongsville; Jeff White, Sheffield Lake, both of OH (US)

(73) Assignee: AlliedSignal Truck Brake Systems Co., Elyria, OH (US)

( * ) Notice: Subject to any disclaimer, the term of this patent is extended or adjusted under 35 U.S.C. 154(b) by 0 days.

(21) Appl. No.: 09/393,540

(22) Filed: Sep. 10, 1999

(51) Int. Cl.[7] ............................................... H01H 47/00
(52) U.S. Cl. ........................................................ 361/152
(58) Field of Search ................................. 361/152, 191, 361/154; 303/150; 327/387; 307/125

(56) References Cited

U.S. PATENT DOCUMENTS

| | | | |
|---|---|---|---|
| 4,140,353 A | * | 2/1979 | Riordan ...................... 303/150 |
| 4,433,357 A | | 2/1984 | Nishimura et al. |
| 4,455,587 A | | 6/1984 | Potthof et al. |
| 4,595,967 A | | 6/1986 | Potthof |
| 5,729,164 A | | 3/1998 | Pattantyus |
| 5,828,261 A | * | 10/1998 | Antone et al. .............. 327/387 |
| 5,870,270 A | | 2/1999 | Riley et al. |
| 5,892,650 A | * | 4/1999 | Kinoshita et al. ........... 361/159 |
| 6,055,148 A | * | 4/2000 | Grover ........................ 361/103 |

FOREIGN PATENT DOCUMENTS

| | | |
|---|---|---|
| EP | 0 692 864 | 1/1996 |
| WO | 99 31696 | 6/1999 |

* cited by examiner

*Primary Examiner*—Josie Ballato
(74) *Attorney, Agent, or Firm*—Calfee, Halter & Griswold LLP

(57) ABSTRACT

An electrical driver circuit for a cantilever solenoid valve includes first and second electrical switching devices for converting logical control input signals into respective control outputs. Third and fourth electrical switching devices are controlled as a function of the control output produced by the first switching device. Fifth and sixth electrical switching devices are controlled as a function of the control output produced by the second switching device. A voltage potential difference is created between a first electrically common point, defined between the third and fourth switching devices, and a second electrically common point, defined between the fifth and sixth switching devices, as a function of the logical signals received into the first and second switching devices.

17 Claims, 11 Drawing Sheets

ELECTRICAL DRIVER CIRCUIT FOR DIRECT ACTING CANTILEVER SOLENOID VALVE

BACKGROUND OF THE INVENTION

The present invention relates to brake pressure control mechanisms for electrically controlled braking systems. It finds particular application in conjunction with an anti-lock braking system ("ABS") and will be described with particular reference thereto. It will be appreciated, however, that the invention is also amenable to other like applications.

Vehicles equipped with an ABS are becoming more common. ABS's typically cycle through three (3) phases, including (1) building, (2) holding, and (3) exhausting pressure in a brake chamber, to control the braking action. A solenoid valve within the ABS is controlled electronically to selectively achieve one of three (3) positions. Each position of the solenoid valve corresponds to one (1) of the three (3) respective phases of the ABS.

The solenoid valve includes a supply port, an exhaust port, and a delivery port. Electrical coils surround a magnetic armature core within the solenoid. The armature core is positioned within the solenoid valve as a function of current passing through the electrical coils. The coil current is determined by control signals generated within the ABS. The three (3) ports are opened and/or closed independently of each other, to achieve the three (3) phases of the ABS, as a function of the armature core position.

ABS applications must be capable of switching between building, holding, and exhausting pressure in the brake chamber very quickly. Consequently, the valves used in the ABS applications must quickly switch among the three (3) states.

Two (2) different types of solenoid valves (i.e., pneumatic piloted valves and direct drive valves) are commonly used in ABS applications. Pneumatic piloted valves use electricity to activate the pilot pressure that, in turn, controls the pressure in the brake chamber. However, pneumatic piloted valves usually have more components and more complicated structures relative to direct drive valves. Therefore, pneumatic piloted valves are typically more difficult and more costly to manufacture than direct drive valves. One drawback to direct drive valves, however, is that they require larger electrical coils to drive their armature cores in order to build, hold, and exhaust the pressure in the brake chamber. This is especially true in 12 volt direct-current ("VDC") environments, which are typically available in vehicles incorporating ABS. For this reason, pneumatic piloted valves are often used instead of direct driving valves for ABS applications in vehicles.

The present invention provides a new and improved apparatus and method which overcomes the above-referenced problems and others.

SUMMARY OF THE INVENTION

An electrical driver circuit for a cantilever solenoid valve includes a first electrical switching device for converting a first logical control input signal into a first valve control output and a second electrical switching device for converting a second logical control input signal into a second valve control output. Third and fourth electrical switching devices are controlled as a function of the first valve control output produced by the first switching device. Fifth and sixth electrical switching devices are controlled as a function of the second valve control output produced by the second switching device. A voltage potential difference is created between a first electrically common point, defined between the third and fourth switching devices, and a second electrically common point, defined between the fifth and sixth switching devices, as a function of the logical control input signals.

In accordance with one aspect of the invention, the first and second electrical switching devices each includes a collector electrically connected to an electrical power source and an emitter electrically connected to a ground.

In accordance with a more limited aspect of the invention, respective control inputs to the third and fourth switching devices are electrically connected to the collector of the first switching device. Also, respective control inputs to the fifth and sixth switching devices are electrically connected to the collector of the second switching device.

In accordance with a more limited aspect of the invention, the third and fourth switching devices each includes a collector and an emitter. The collector of the third switching device is electrically connected to the power source. The emitter of the fourth switching device is electrically connected to the ground. The first electrically common point is created by electrically connecting the emitter of the third switching device to the collector of the fourth switching device. The fifth and sixth switching devices each includes a collector and an emitter. The collector of the fifth switching device is electrically connected to the power source. The emitter of the sixth switching device is electrically connected to the ground. The second electrically common point is created by electrically connecting the emitter of the fifth switching device to the collector of the sixth switching device.

One advantage of the present invention is that a −12 VDC to +12 VDC differential voltage range is supplied to the solenoid valve using only a single +12 VDC power source.

Another advantage of the present invention is that, because at most only one-half (½) of the driver circuit is energized at a single time, the driver circuit is relatively energy efficient.

Another advantage of the present invention is that fast-switching is achieved between build, hold, and exhaust phases of a solenoid valve.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
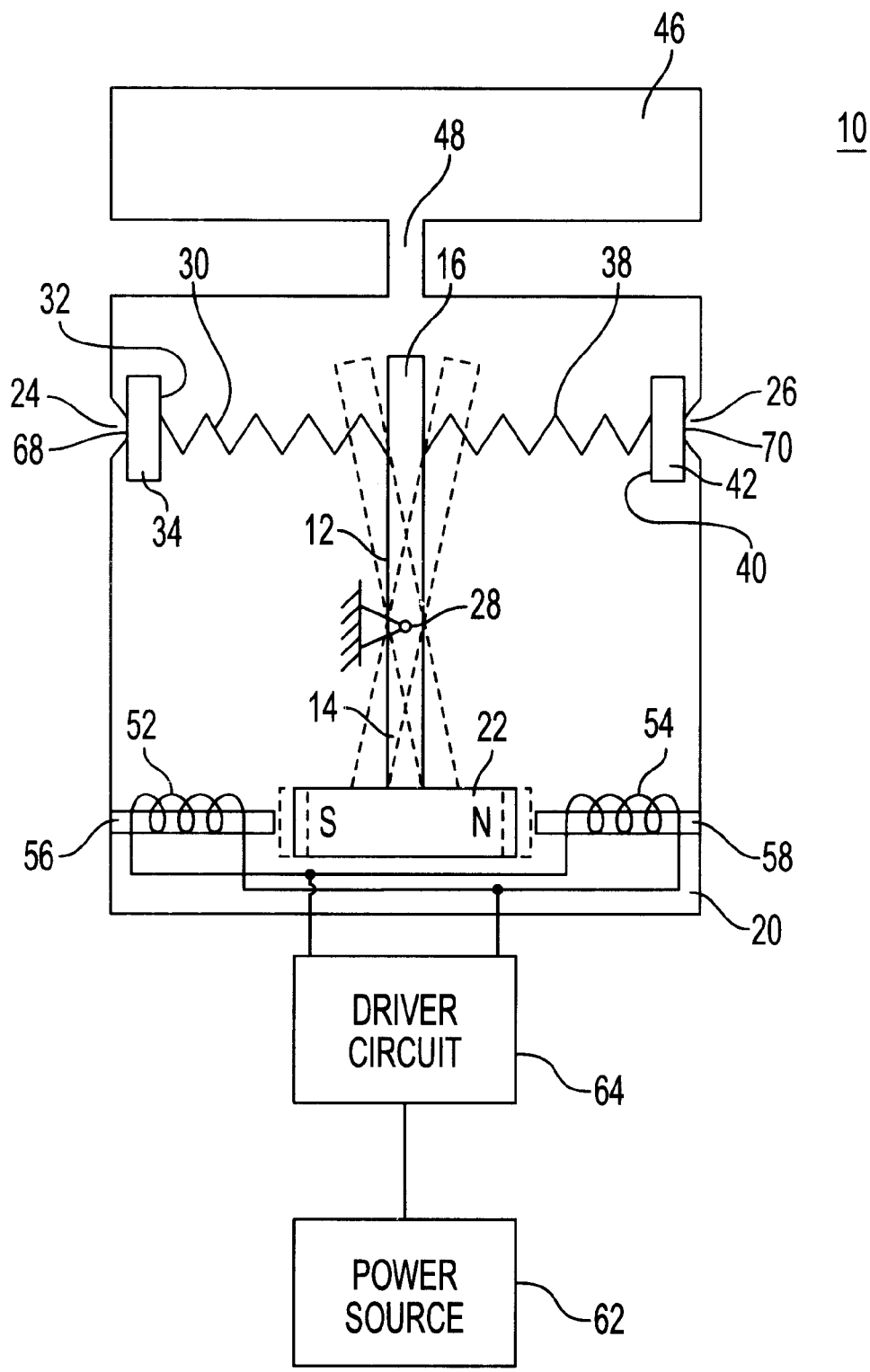
FIG. 1 shows a cantilever type solenoid valve according to the present invention.

FIG. 1 illustrates a three-state solenoid valve 10. A cantilever 12, which includes first and second ends 14, 16, respectively, is included within a valve chamber 20 of the valve 10. The first end 14 of the cantilever 12 is connected to a magnet 22. The second end 16 of the cantilever 12 moves between an inlet port 24 and an outlet port 26. The cantilever 12 pivots around a point 28 between the first and second ends 14, 16, respectively. The valve chamber 20 communicates with a source of compressed air via the inlet port 24. The outlet port 26 provides a passage from the valve chamber 20 to the exterior atmosphere. A first spring 30 is mechanically connected between the cantilever 12 and a first face 32 of a first seal 34. Similarly, a second spring 38 is mechanically connected between the cantilever 12 and a first face 40 of a second seal 42. The valve chamber 20 communicates with a brake chamber 46 via a delivery port 48.

First and second coils 52, 54, respectively, surround first and second pieces of a magnetic material (e.g., iron) 56, 58, respectively. The coils 52, 54 are electrically connected to an electrical source 62 via a driver circuit 64. The electrical source 62 is preferably a 12 VDC power source, which is the source of power for the vehicle. The power source 62 provides an output voltage with a nominal value of +12 VDC. The driver circuit 64 selectively creates a voltage potential difference, which is within the range of −12 VDC to +12 VDC, across the first and second coils 52, 54, respectively.

The voltage supplied by the driver circuit 64 to the coils 52, 54 causes, a magnetic field to be created between the pieces of magnetic material 56, 58, thereby causing the magnet 22 to be attracted to one of the first and second pieces of magnetic material 56, 58. Because the second end 16 of the cantilever 12 is secured to the magnet 22, the cantilever 12 pivots around the point 28 as a function of the magnetic field between the pieces of magnetic material 56, 58.

To achieve the holding state, a voltage of approximately zero (0) VDC is supplied by the driver circuit 64 to the coils 52, 54. A voltage of approximately zero (0) VDC causes the magnet 22 and, consequently, the first end 14 of the cantilever 12, to be positioned approximately one-half (½) of the distance between the inlet port, 24 and the outlet port 26. The first and second springs 30, 38, respectively, are biased such that when the first end 14 is positioned approximately halfway between the inlet and outlet ports 24, 26, respectively, a second face 68 of the first seal 34 sealingly covers the inlet port 24 and a second face 70 of the second seal 42 sealingly covers the outlet port 26. Therefore, no compressed air enters the valve chamber 20 through the inlet port 24 or escapes from the valve chamber 20 via the outlet port 26. The pressure between the valve chamber 20 and the brake chamber 46 is substantially equalized through the delivery port 48.

To achieve the building state, a voltage of about zero (0) VDC is supplied by the driver circuit 64 to the first coil 52 and a voltage of about +12 VDC is supplied to the second coil 54. A positive reference direction is defined to be from left to right in FIG. 1 (i.e., from the first piece of magnetic material 56 to the second piece of magnetic material 58). Therefore, about −12 VDC exists between the coils 52, 54. A voltage of approximately −12 VDC causes the magnet 22 and, consequently, the first end 14 of the cantilever 12 to be positioned toward the first piece of magnetic material 56 (i.e., towards the left). Consequently, the second end 16 of the cantilever 12 is positioned toward the outlet port 26 (i.e., towards the right). In this position, the second spring 38 is compressed, thereby disposing the second face 70 of the second seal 42 sealingly against the outlet port 26. However, the first spring 30 is expanded and the second face 68 of the first seal 34 does not contact the inlet port 24. Therefore, compressed air enters the valve chamber 20 through the inlet port 24 while air is prevented from escaping via the outlet port 26. Because the pressure between the valve chamber 20 and the brake chamber 46 is substantially equalized via the delivery port 48, compressed air entering the valve chamber 20 causes pressure within both the valve chamber 20 and the brake chamber 46 to increase.

To achieve the exhausting state, a voltage of about +12 VDC is supplied by the driver circuit 64 to the first coil 52 and a voltage of about zero (0) VDC is supplied to the second coil 54. Therefore, about +12 VDC exists between the coils 52, 54. A voltage of about +12 VDC causes the magnet 22 and, consequently, the first end of the cantilever 12 to be positioned toward the second piece of the magnetic material 58 (i.e., towards the right). Consequently, the second end 16 of the cantilever 12 is positioned toward the inlet port 24. In this position, the first spring 30 is compressed, thereby disposing the second face 68 of the first seal 34 sealingly against the inlet port 24. However, the second spring 38 is expanded and the second face 70 of the second seal 42 does not contact the outlet port 26. Therefore, compressed air is prevented from entering the valve chamber 20 through the inlet port 24 while the pressure within the valve chamber 20 is equalized with the external atmosphere via the outlet port 26. The pressure within the brake chamber 46 is similarly equalized with the external atmosphere via the delivery port 48.

Figure 2:
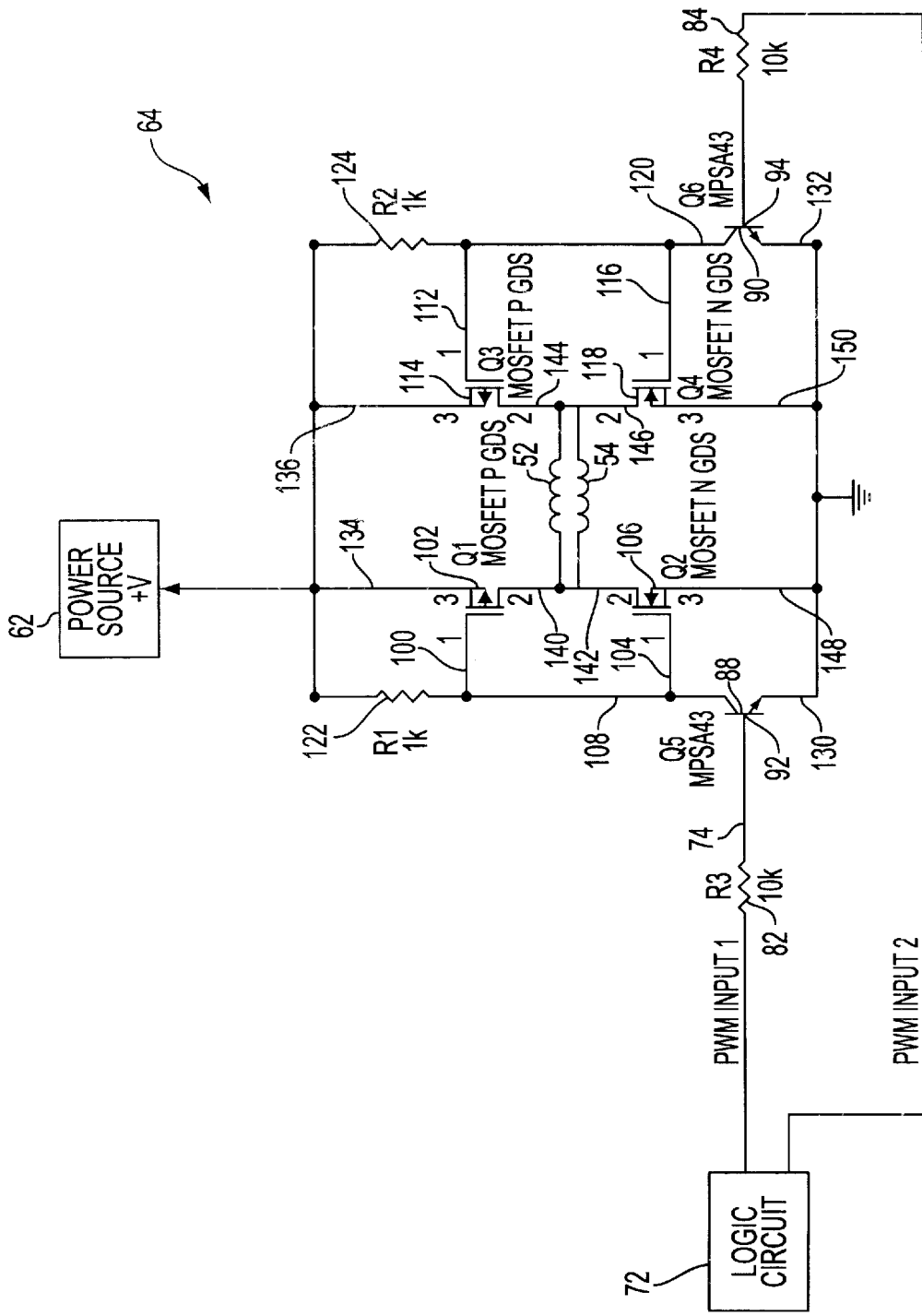
FIG. 2 shows a schematic diagram of the driving circuit.

FIG. 2 illustrates an electrical schematic of the driving circuit 64. A logic circuit 72 provides inputs to the driving circuit 64 via first and second input lines 74, 76, respectively. The logic circuit 72 independently produces either a logical "high" of about +5 VDC or a logical "low" of about zero (0) VDC on the first and second input lines 74, 76, respectively. First and second resistors 82, 84, respectively, are included along the respective input lines 74, 76 to limit current entering the driving circuit 64.

The driving circuit 64 includes first and second switching devices (e.g., transistors) 88, 90, respectively. The first and second input lines 74, 76 are electrically connected to control inputs 92, 94 of the respective first and second transistors 88, 90. The logical signals provided on the input lines 74, 76 are used as control signals for turning the transistors 88, 90 between an "on" state and an "off" state. If a logical high value is provided to the control input 92 of the first transistor 88, the first transistor 88 is switched to the on state; if a logical low value is provided to the control input 92 of the first transistor 88, the first transistor 88 is switched to the off state. The second transistor 90 operates in a similar manner. When the first and second input lines 74, 76, respectively, provide logically opposite signals to the control inputs 92, 94, the first and second transistors 88, 90, respectively, are switched to opposite states relative to one another (i.e., when the first transistor 88 is switched to the on state, the second transistor 90 is switched to the off state, and visa-versa).

A control line 100 of a third switching device (e.g., a p-type MOSFET) 102 and a control line 104 of a fourth switching device (e.g., an n-type MOSFET) 106 are electrically connected to a collector line 108 of the first transistor 88. Similarly, a control line 112 of a fifth switching device (e.g., a p-type MOSFET) 114 and a control line 116 of a sixth switching device (e.g., an n-type MOSFET) 118 are electrically connected to a collector line 120 of the second transistor 90. The respective collector lines 108, 120 of the switching devices 88, 90 are also electrically connected to the power source 62 via third and fourth resistors 122, 124, respectively. An emitter 130 of the first switching device 88 is electrically connected to a ground; similarly, an emitter 132 of the second switching device 90 is electrically connected to the ground.

Respective first switched lines 134, 136 of the third and fifth switching devices 102, 114, respectively, are electrically connected to the power source 62. A second switched line 140 of the third switching device 102 is electrically connected to respective first ends of the coils 52, 54 and to a first switched line 142 of the fourth switching device 106. A second switched line 144 of the fifth switching device 114 is electrically connected to respective second ends of the coils 52, 54 and to a first switched line 146 of the sixth switching device 118. Respective second switched lines 148, 150 of the fourth and sixth switching devices 106, 118 are electrically connected to the ground.

When a logical low signal is supplied to the first input line 74, the first switching device 88 turns off, thereby supplying logical high signals to the respective control lines 100, 104 of the third and fourth switching devices 102, 106, respectively. When a logical high signal is supplied to the first input line 74, the first switching device 88 turns on, thereby supplying logical low signals to the respective control lines 100, 104 of the third and fourth switching devices 102, 106, respectively. The second switching device 90 controls the fifth and sixth switching devices 114, 118, respectively, in a similar manner.

With reference to FIGS. 1 and 2, when it is desirable to build a pressure in the brake chamber 46, a logical low signal is supplied to the first input line 74 and, consequently, a logical high signal is supplied to the second input line 76. Therefore, the first switching device 88 is turned to the off state and the second switching device 90 is turned to the on state. When the first switching device 88 is in the off state, logical high signals are supplied to the control lines of both the third and fourth switching devices 102, 106, respectively. Consequently, the third switching device 102 is turned to an off state and the fourth switching device 106 is turned to an on state. At the same time, when the second switching device 90 is in the on state, logical low signals are supplied to the control lines of both the fourth and sixth switching devices 114, 118, respectively. Consequently, the fifth switching device 114 is turned to an on state and the sixth switching device 118 is turned to an off state.

In this manner, current flows from the power source 62, to the ground via the fifth switching device 114, the coils 52, 54, and the fourth switching device 106. In other words, current flows from the right to the left sides of the coils 52, 54, thereby creating a −12 VDC potential difference between the coils 52, 54. The −12 VDC potential difference causes the second end 16 of the cantilever 12 to be positioned toward the outlet port 26, thereby causing the second seal 42 to seal the outlet port 26 and the first seal 34 to be removed from the inlet port 24.

When it is desirable to exhaust pressure from the brake chamber 46, a logical high signal is supplied to the first input line 74 and a logical low signal is supplied to the second input line 76. Therefore, the first switching device 88 is turned to the on state and the second switching device 90 is turned to the off state. When the first switching 88 is in the on state, logical low signals are supplied to the control lines of both the third and fourth switching devices 102, 106, respectively. Consequently, the third switching device 102 is turned to an on state and the fourth switching device 106 is turned to an off state. At the same time, when the second switching device 90 is in the off state, logical high signals are supplied to the control lines of both the fifth and sixth switching devices 114, 118, respectively. Consequently, the fifth switching device 114 is turned to an off state and the sixth switching device 118 is turned to an on state.

In this manner, current flows from the power source 62, to the ground via the third switching device 102, the coils 52, 54, and the sixth switching device 118. In other words, current flows from the left to the right sides of the coils 52, 54, thereby creating a +12 VDC potential difference between the coils 52, 54. The +12 VDC potential difference causes the second end 16 of the cantilever 12 to be positioned toward the inlet port 24, thereby causing the first seal 34 to seal the inlet port 24 and the second seal 42 to be removed from the outlet port 26.

Pressure is held in the brake chamber 46 during a period when a zero (0) VDC potential difference exists across the coils 52, 54. A zero (0) VDC potential difference is achieved across the coils 52, 54 when both of the input lines 74, 76 are either low or high. Similarly, a zero (0) VDC potential difference exists across the coils 52, 54 at some point when the driving circuit 64 is transitioning between the building and exhausting phases. It is evident from the discussion above that even if both of the input lines 74, 76 are low or high, only two (2) of the four (4) switching devices 102, 106, 114, 118 are on at any one time.

Figure 3:
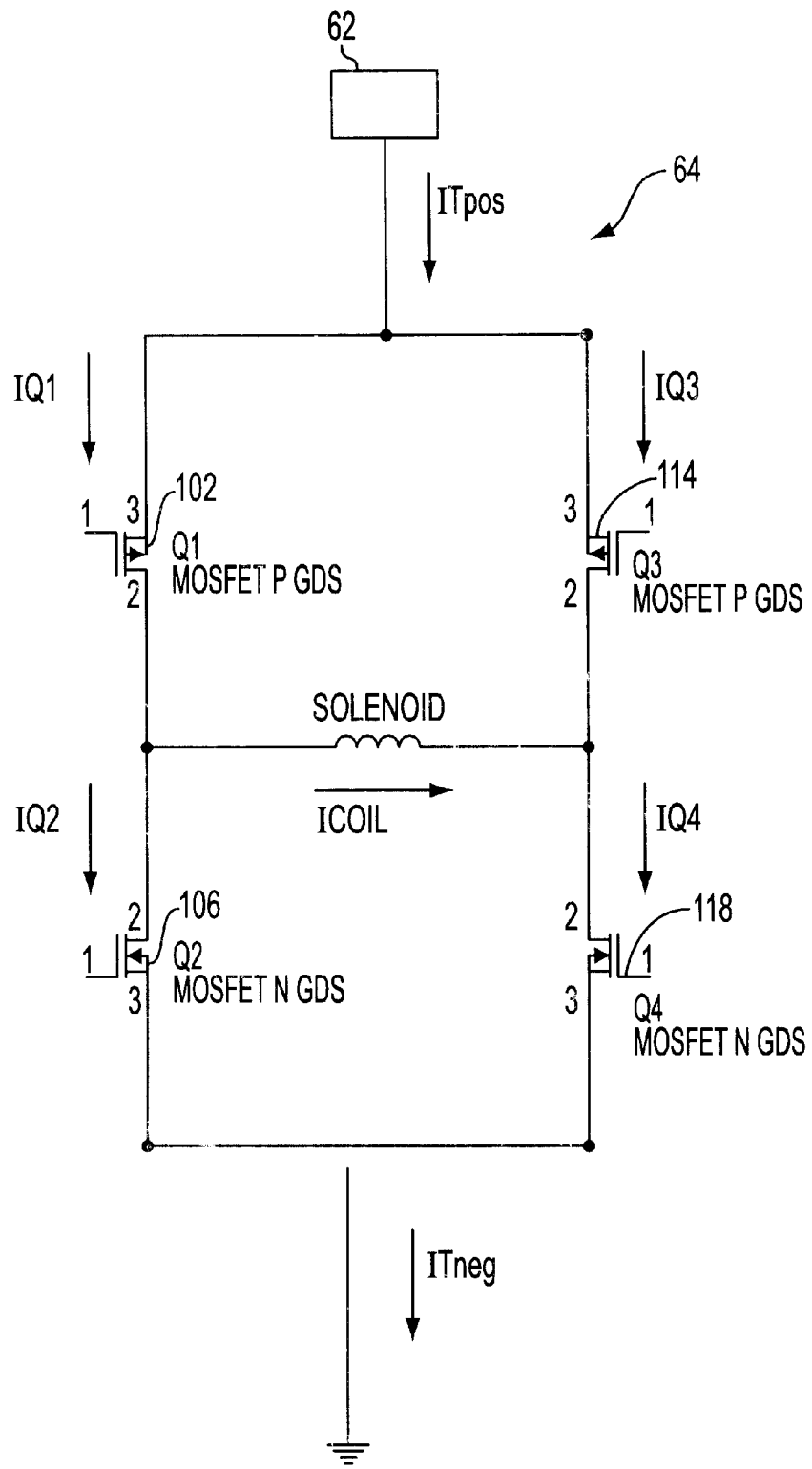
FIG. 3 illustrates current paths through the driving circuit.

FIG. 3 shows the schematic of the switching devices 102, 106, 114, 118 connected between the power source 62 and the ground, along with arrows ITpos, ITneg, IQ1, IQ2, IQ3, IQ4, and Icoil defining respective positive directions of current flow.

Figure 4:
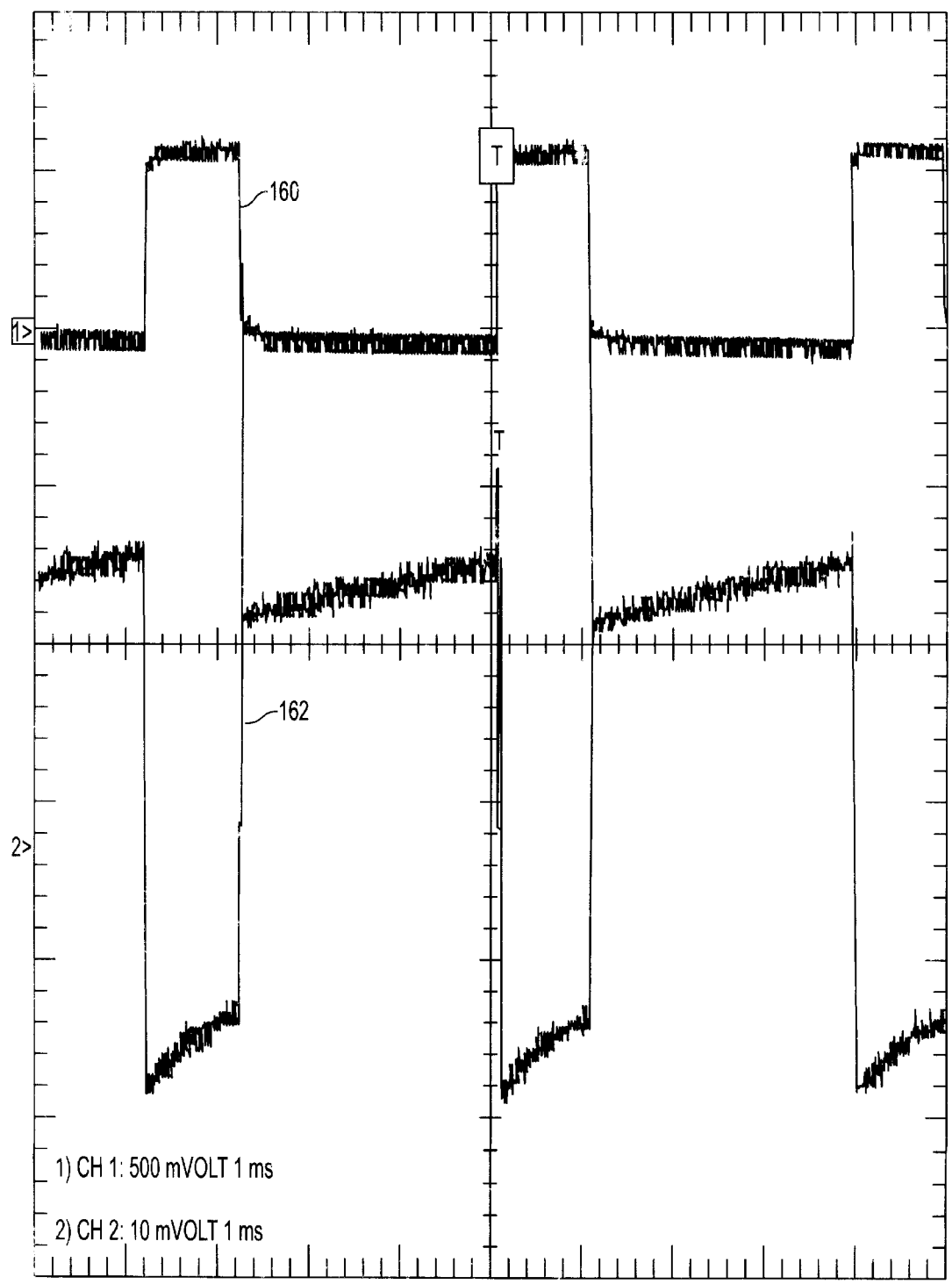
FIGS. 4–11 illustrate graphs showing various currents flowing through the driving circuit as a function of inputs.

FIG. 4 illustrates first and second waves 160, 162, respectively, representing the logical signal along the first input line 74 and the current ITpos provided from the power source 62, respectively. With reference to FIGS. 3 and 4, the current ITpos provided from the power source 62 (represented by the second wave 162) is positive when the logical signal along the first input line 74 (represented by the first wave 160) is low. When the logical signal along the first input line 74 (represented by the first wave 160) turns to a logical high, the current ITpos provided from the power source 62 (represented by the second wave 162) becomes negative.

Figure 5:
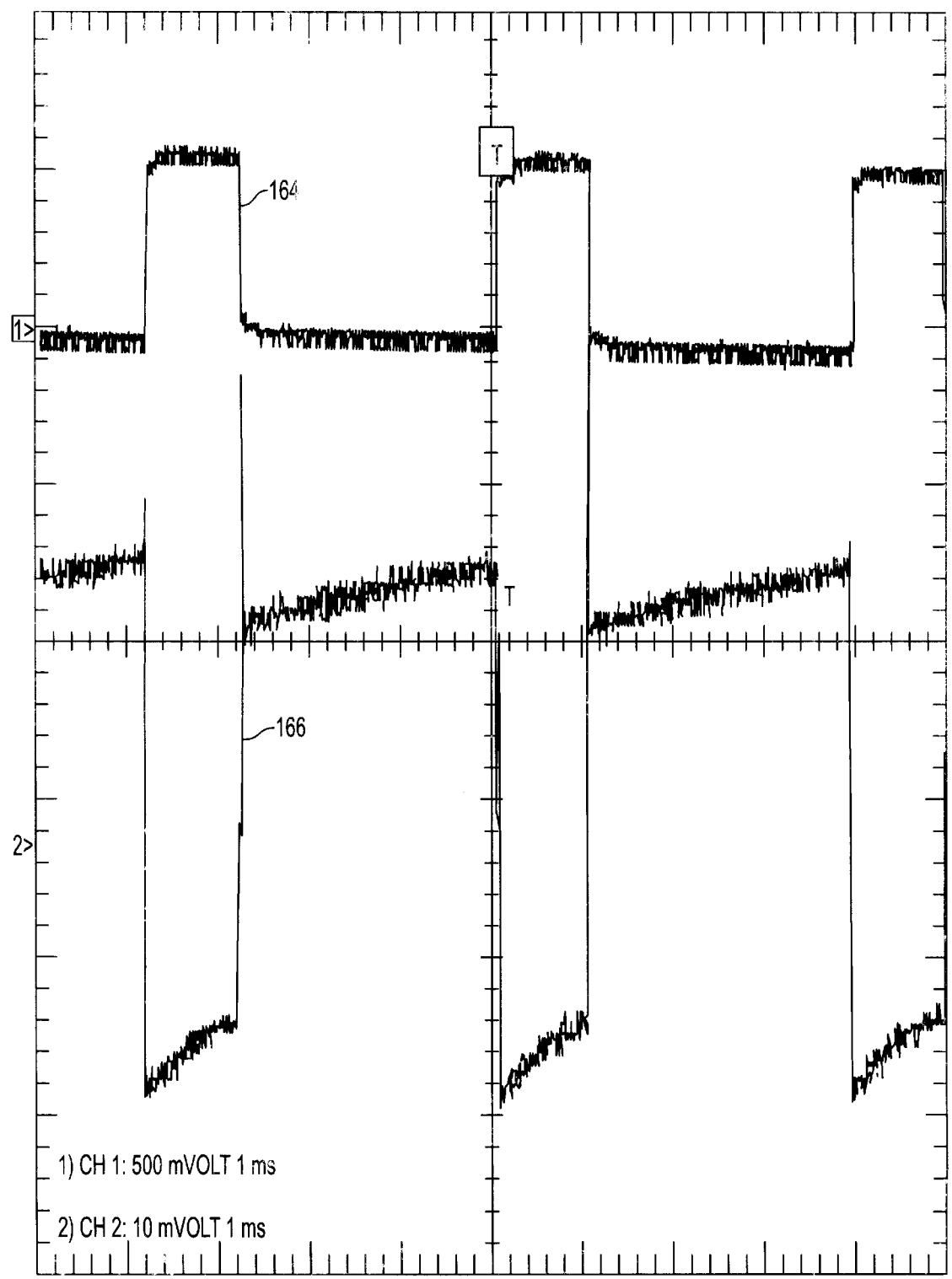

FIG. 5 illustrates third and fourth waves 164, 166, respectively, representing the logical signal along the first input line 74 and the current ITneg provided to the ground, respectively. The third and fourth waves 164, 166, respectively, illustrate that the relationship between the logical signal along the first input line 74 and the current ITneg provided to the ground is the same as the relationship between the logical signal along the first input line 74 and the current ITpos provided from the power source 62.

Figure 6:
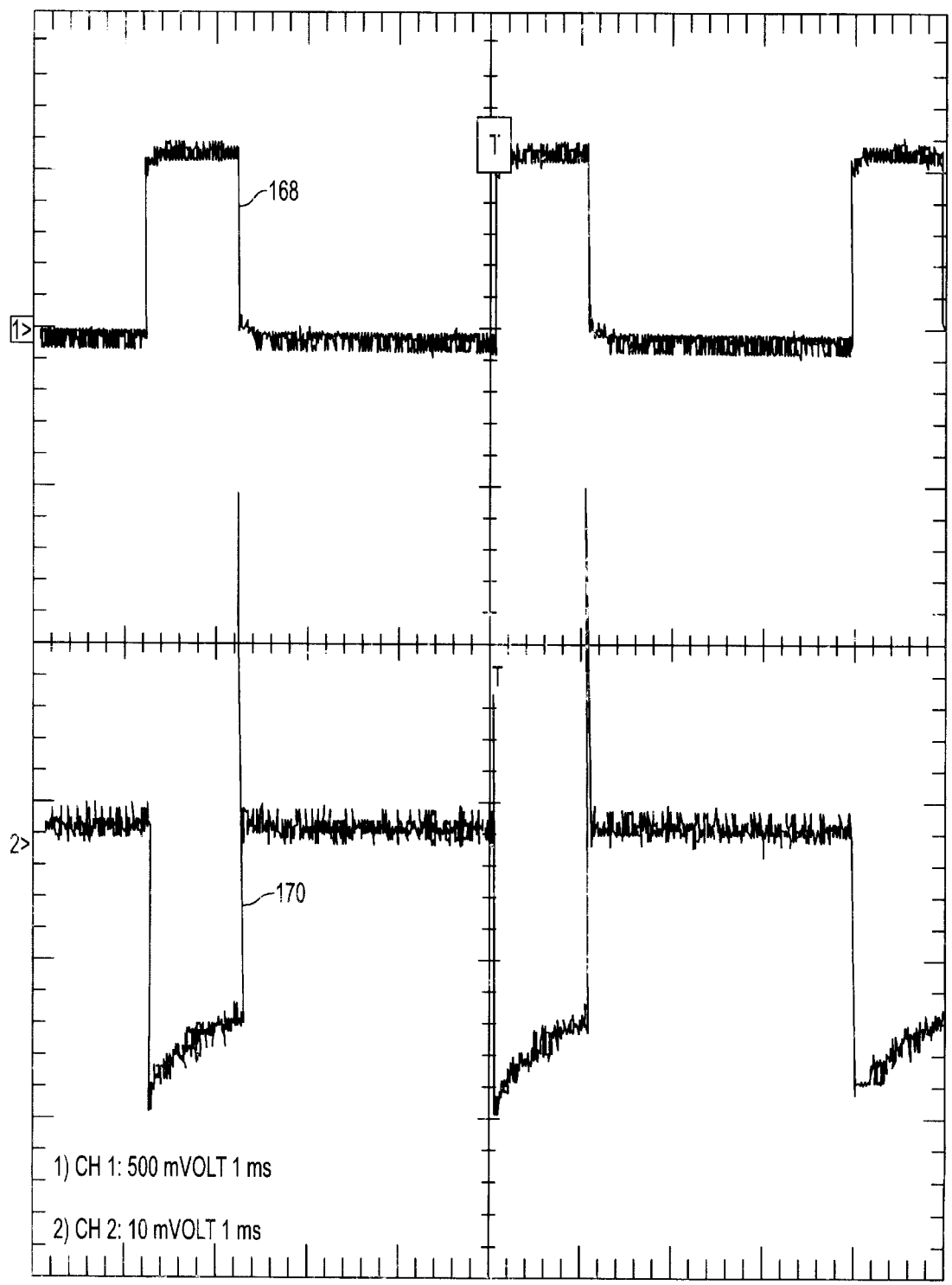

FIG. 6 illustrates fifth and sixth waves 168, 170, respectively, representing the logical signal along the first input line 74 and the current IQ1 through the third switching device 102, respectively. With reference to FIGS. 3 and 6, the current IQ1 through the third switching device 102 (represented by the sixth wave 170) is about zero (0) VDC when the logical signal along the first input line 74 (represented by the fifth wave 168) is low. When the logical signal along the first input fine 74 (represented by the fifth wave 168) turns to a logical high, the current IQ1 through the third switching device 102 (represented by the sixth wave 170) becomes negative.

Figure 7:
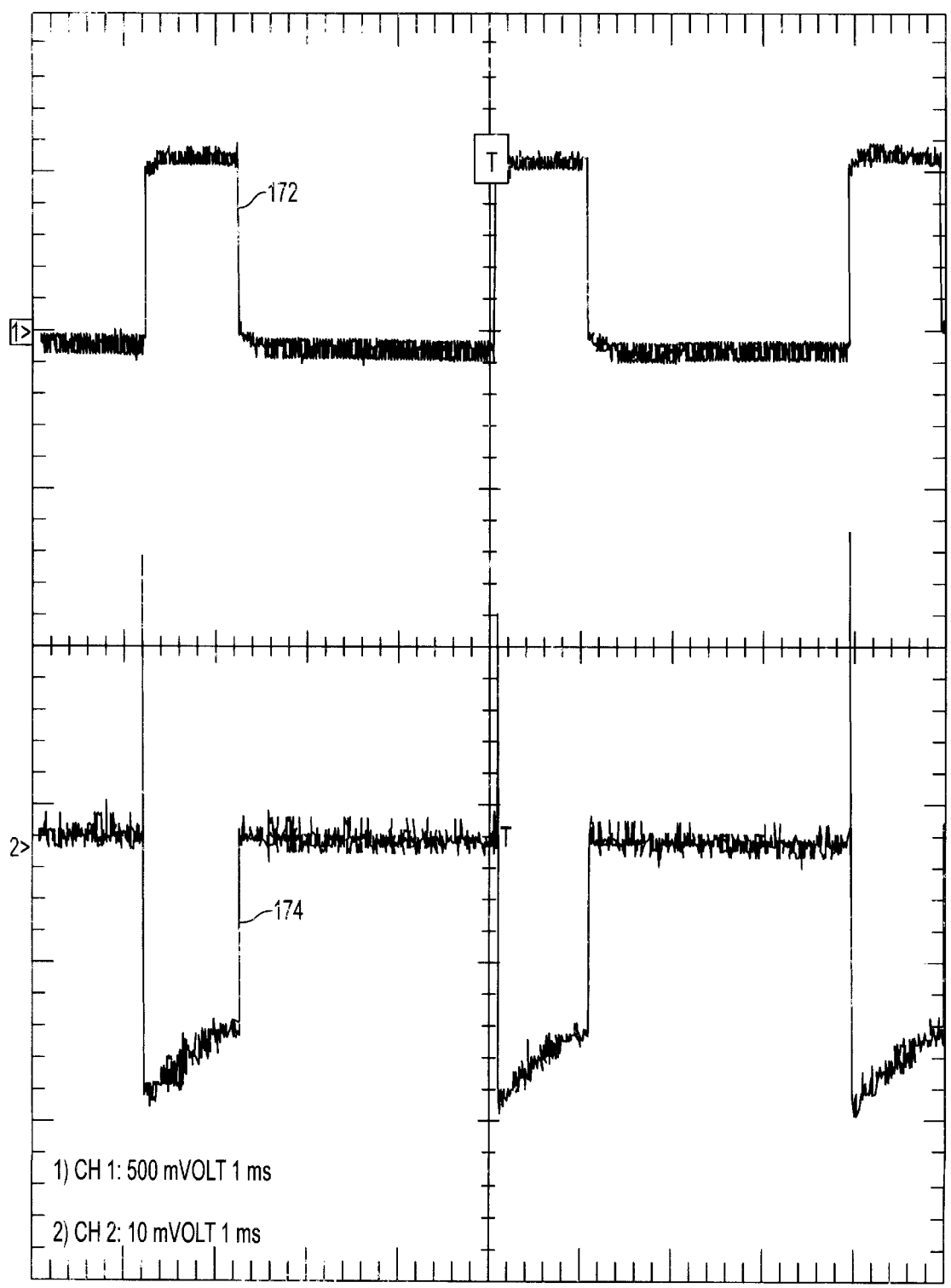

FIG. 7 illustrates seventh and eighth waves 172, 174, respectively, representing the logical signal along the first input line 74 and the current IQ4 through the sixth switching device 118, respectively. The seventh and eighth waves 172, 174, respectively, illustrate that the relationship between the logical signal along the first input line 74 and the current IQ4 through the sixth switching device 118 is the same as the relationship between the logical signal along the first input line 74 and the current IQ1 through the third switching device 102.

Figure 8:
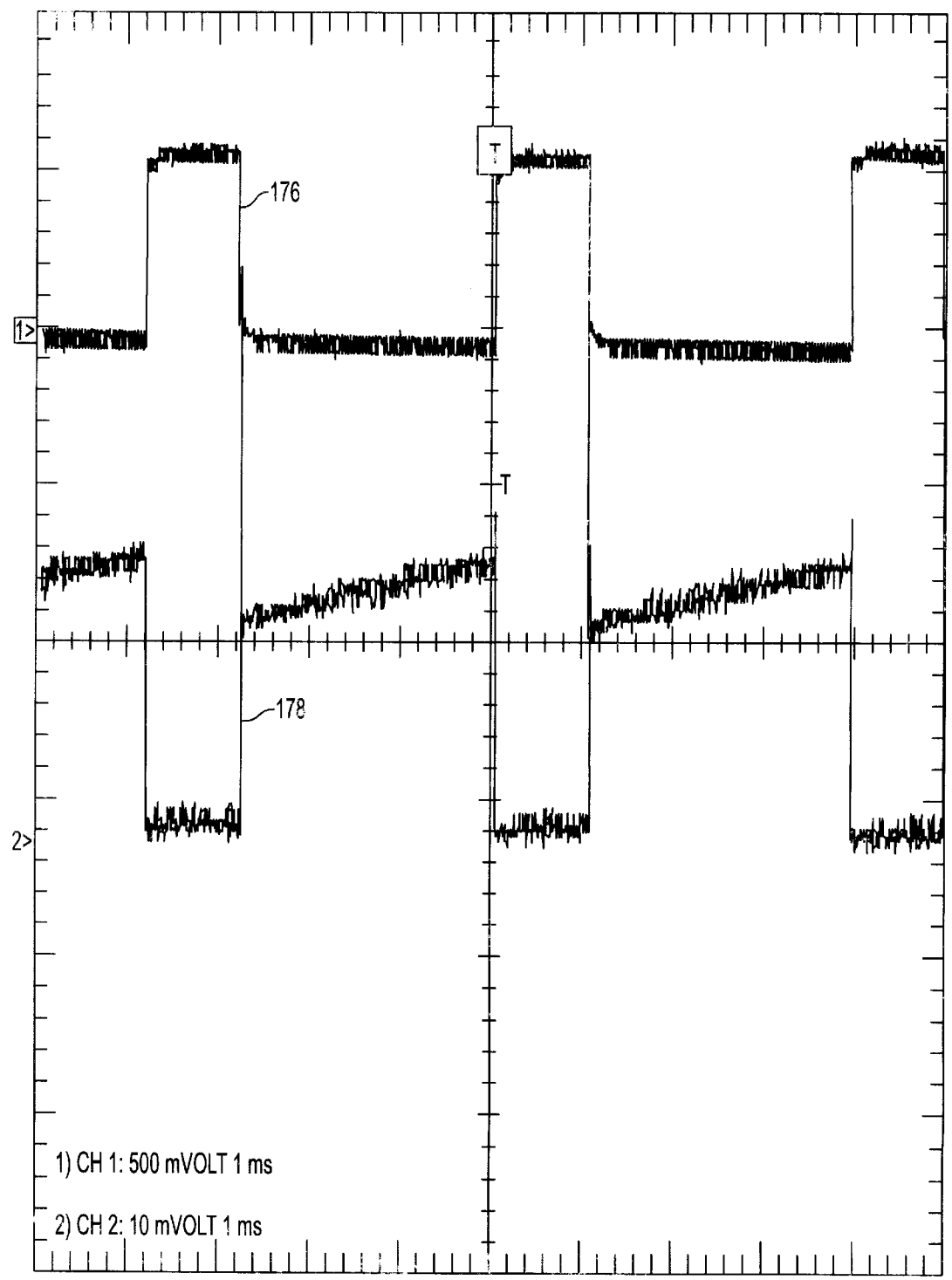

FIG. 8 illustrates ninth and tenth waves 176, 178, respectively, representing the logical signal along the first input line 74 and the current IQ2 through the fourth switching device 106, respectively. With reference to FIGS. 3 and 8, the current IQ2 through the fourth switching device 106 (represented by the tenth wave 178) is positive when the logical signal along the first input line 74 (represented by the ninth wave 176) is low. When the logical signal along the first input line 74 (represented by the ninth wave 176) turns to a logical high, the current IQ2 through the fourth switching device 106 (represented by the tenth wave 178) becomes about zero (0) VDC.

Figure 9:
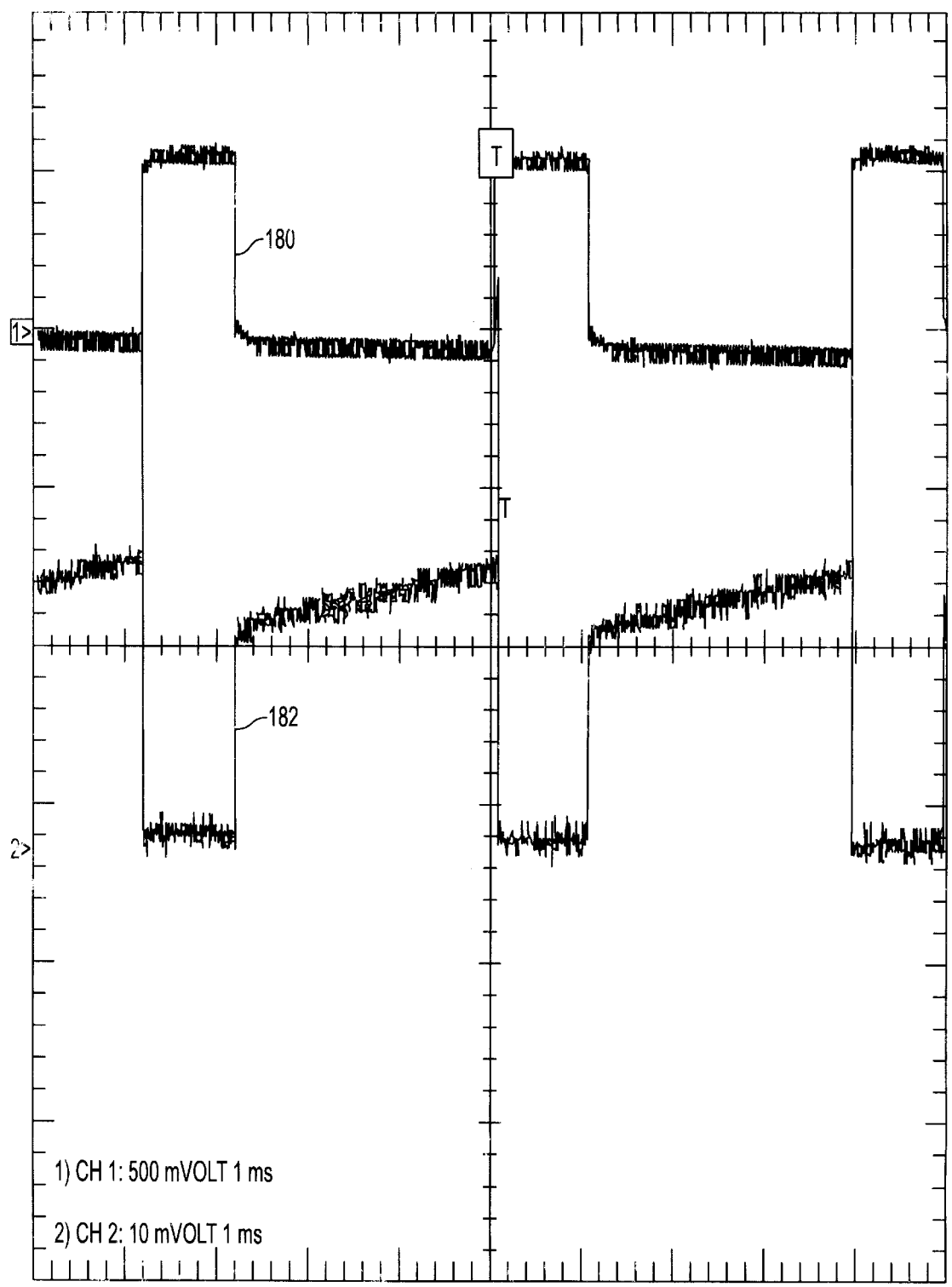

FIG. 9 illustrates eleventh and twelfth waves 180, 182, respectively, representing the logical signal along the first input line 74 and the current IQ3 through the fifth switching device 114, respectively. The eleventh and twelfth waves 180, 182, respectively, illustrate that the relationship between the logical signal along the first input line 74 and the current IQ3 through the fifth switching device 114 is the same as the relationship between the logical signal along the first input line 74 and the current IQ2 through the fourth switching device 106.

Figure 10:
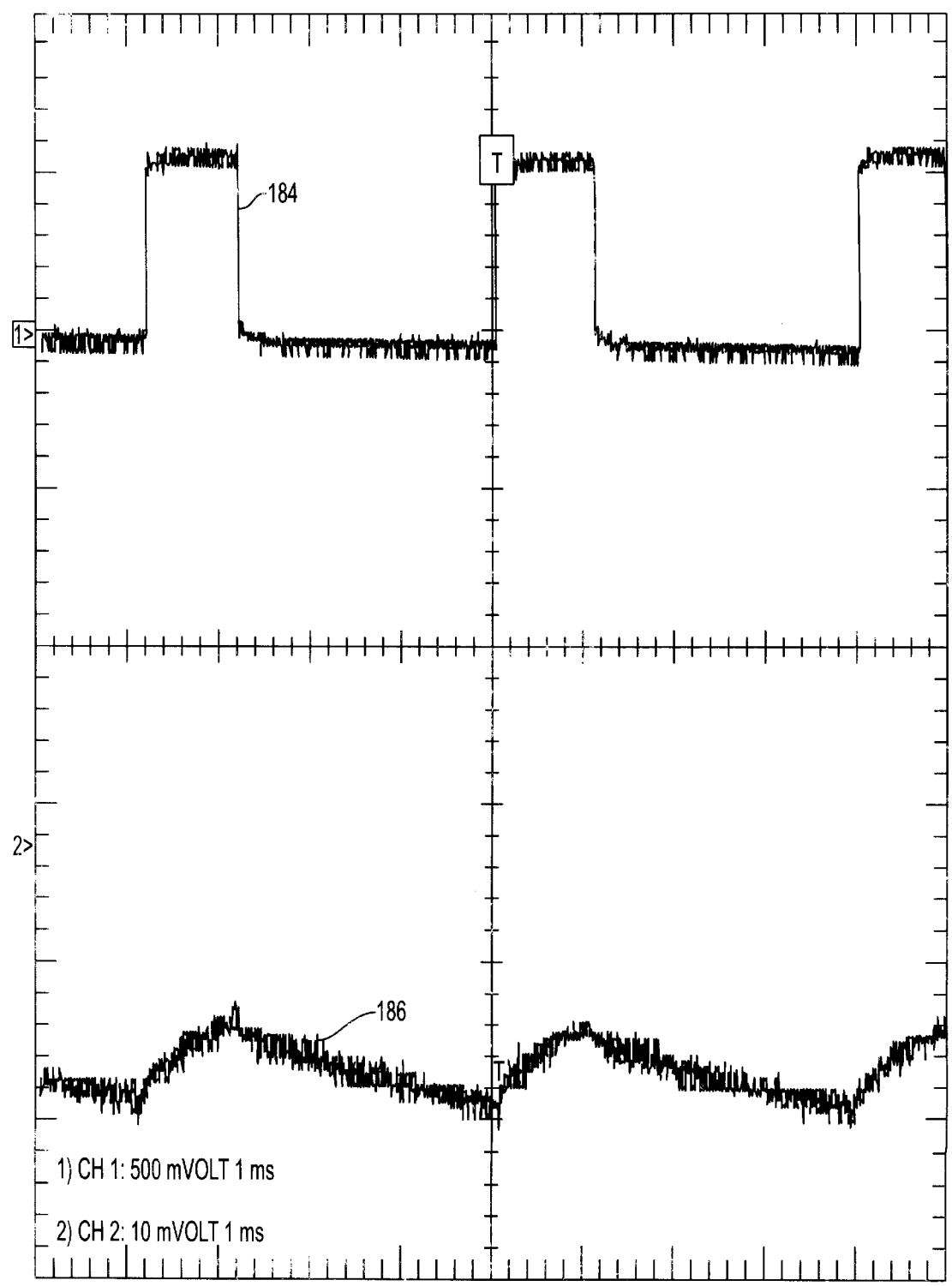

FIG. 10 illustrates thirteenth and fourteenth waves 184, 186, respectively, representing the logical signal along the first input line 74 and the current Icoil through the coils 52, 54, respectively. With reference to FIGS. 3 and 10, the current Icoil through the coils 52, 54 (represented by the fourteenth wave 186) is negative when the logical signal along the first input line 74 (represented by the thirteenth wave 184) is low. When the logical signal along the first input line 74 (represented by the thirteenth wave 184) turns to a logical high, the current Icoil through the coils 52, 54 (represented by the fourteenth wave 186) becomes relatively more positive. As noted in FIG. 10, the scale along the horizontal axis is one (1) millisecond per division.

Figure 11:
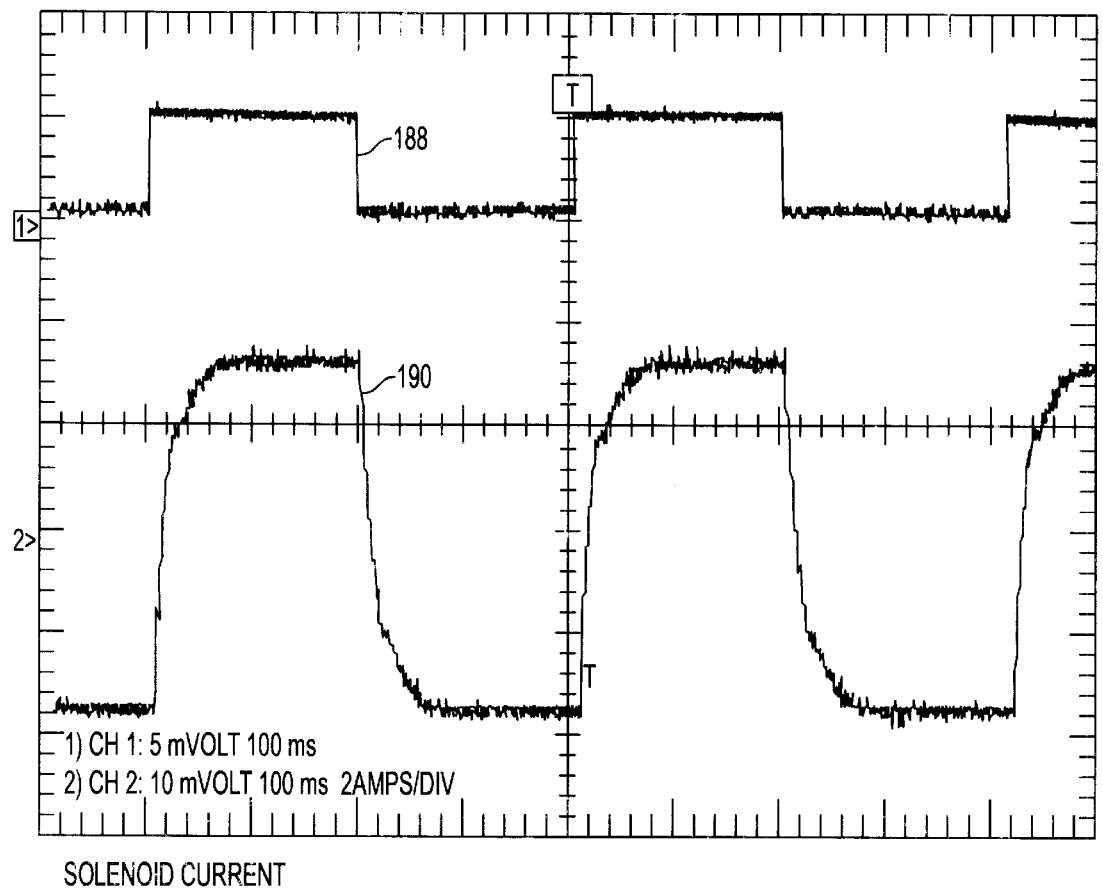

FIG. 11 illustrates fifteenth and sixteenth waves 188, 190, respectively, representing the logical signal along the first input line 74 and the current Icoil through the coils 52, 54, respectively. As opposed to FIG. 10, the scale along the horizontal axis in FIG. 11 is 100 milliseconds per division. With reference to FIGS. 3 and 11, the current Icoil through the coils 52, 54 (represented by the sixteenth wave 190) is negative when the logical signal along the first input line 74 (represented by the fifteenth wave 188) is low. When the logical signal along the first input line 74 (represented by the fifteenth wave 188) turns to a logical high, the current Icoil through the coils 52, 54 (represented by the sixteenth wave 190) becomes positive.

As illustrated in FIGS. 3–11, the third and sixth switching devices 102, 118, respectively, are turned to an off state when the logical signal along the first input line 74 is a logical low. However, the fifth and fourth switching devices 114, 106, respectively, are turned to an on state. Therefore, current passes from the power source 62, through the fifth switching device 114, the coils 52, 54, and the fourth switching device 106 before reaching the ground. Therefore, the current Icoil through the coils 52, 54 is negative, thereby causing the brake chamber to build pressure.

Also, the fifth and fourth switching devices 114, 106, respectively, are turned to an off state when the logical signal along the first input line 74 is a logical high. However, the third and sixth switching devices 102, 118, respectively, are turned to an off state. Therefore, current passes from the power source 62, through the third switching device 102, the coils 52, 54, and the sixth switching device 118 before reaching the ground. Therefore, the current Icoil through the coils 52, 54 is positive, thereby causing the brake chamber to exhaust pressure.

Pressure in the brake chamber is held when the current Icoil through the coils 52, 54 is about zero (0).

As described above, not more than two (2) of the switching devices 102, 106, 114, 118 are turned to the on state at one time. Therefore, the driving circuit 64 disclosed in the present invention is more energy efficient relative to previous driving circuits.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An electrical driver circuit for a cantilever solenoid valve, comprising:
   a first electrical switching device for converting a first logical control input signal into a first valve control output;
   a second electrical switching device for converting a second logical control input signal into a second valve control output;
   third and fourth electrical switching devices controlled as a function of the first valve control output produced by the first switching device; and
   fifth and sixth electrical switching devices controlled as a function of the second valve control output produced by the second switching device, a voltage potential difference being created between a first electrically common point, defined between the third and fourth switching devices, and a second electrically common point, defined between the fifth and sixth switching devices, such that either of said first or second electrically common points may have a higher voltage potential compared to the other of said first or second electrically common points, or both the first and second electrically common points may have the same voltage potential, as a function of the logical control input signals.

2. The electrical driver circuit for a cantilever solenoid valve as set forth in claim 1, wherein the first and second electrical switching devices each includes a collector, electrically connected to an electrical power source, and an emitter, electrically connected to a ground.

3. The electrical driver circuit for a cantilever solenoid valve as set forth in claim 2, wherein:
   respective control inputs to the third and fourth switching devices are electrically connected to the collector of the first switching device; and
   respective control inputs to the fifth and sixth switching devices are electrically connected to the collector of the second switching device.

4. The electrical driver circuit for a cantilever solenoid valve as set forth in claim 3, wherein:
   the third and fourth switching devices each includes a collector and an emitter, the collector of the third switching device being electrically connected to the power source, the emitter of the fourth switching device being electrically connected to the ground;

the first electrically common point is created by electrically connecting the emitter of the third switching device to the collector of the fourth switching device;

the fifth and sixth switching devices each includes a collector and an emitter, the collector of the fifth switching device being electrically connected to the power source, the emitter of the sixth switching device being electrically connected to the ground; and the second electrically common point is created by electrically connecting the emitter of the fifth switching device to the collector of the sixth switching device.

5. The electrical driver circuit for a cantilever solenoid valve as set forth in claim 4, wherein:

the voltage potential difference is created between an electrically common point between the third and fourth switching devices and an electrically common point between the fifth and sixth switching devices as a function of the first and second logical control input signals.

6. The electrical driver circuit for a cantilever solenoid valve as set forth in claim 5, further including:

a first resistor electrically connected between the control input of the third switching device and the power source; and a second resistor electrically connected between the control input of the fifth switching device and the power source.

7. The electrical driver circuit for a cantilever solenoid valve as set forth in claim 6, wherein the first and second switching devices are transistors.

8. The electrical driver circuit for a cantilever solenoid valve as set forth in claim 7, wherein:

the third and fifth switching devices are p-type MOSFET's; and the fourth and sixth switching devices are n-type MOSFET's.

9. A brake pressure control system, for establishing a pressure level in a brake chamber of a vehicle, comprising:

at least one coil;

a valve controlled by the at least one coil; and an electrical driver circuit for connecting a voltage source to the at least one coil, including:

a first electrical switching device for converting a first logical control input signal into a first valve control output;

a second electrical switching device for converting a second logical control input signal into a second valve control output;

third and fourth electrical switching devices controlled as a function of the first valve control output; and fifth and sixth electrical switching devices controlled as a function of the second valve control output, a first end of the at least one coil being electrically connected to a first electrically common point, defined between the third and fourth switching devices, and a second end of the at least one coil being electrically connected to a second electrically common point, defined between the fifth and sixth switching devices, one of the first ends and the second ends of the at least one coil being connected to the voltage source through one of said first and second electrically common points and the other of the first ends and the second ends being connected to a ground through the other of said first and second electrically common points as a function of the logical control input signals.

10. The brake pressure control system as set forth in claim 9, wherein the first and second electrical switching devices each includes a collector electrically connected to the electrical power source, and an emitter electrically connected to the ground.

11. The brake pressure control system as set forth in claim 10, wherein:

respective control inputs to the third and fourth switching devices are electrically connected to the collector of the first switching device; and respective control inputs to the fifth and sixth switching devices are electrically connected to the collector of the second switching device.

12. The brake pressure control system as set forth in claim 11, wherein:

the third and fourth switching devices each includes a collector and an emitter, the collector of the third switching device being electrically connected to the power source, the emitter of the fourth switching device being electrically connected to the ground;

the first electrically common point is defined between the emitter of the third switching device and the collector of the fourth switching device;

the fifth and sixth switching devices each includes a collector and an emitter, the collector of the fifth switching device being electrically connected to the power source, the emitter of the sixth switching device being electrically connected to the ground; and the second electrically common point is defined between the emitter of the fifth switching device and the collector of the sixth switching device.

13. The brake pressure control system as set forth in claim 9, further including a logic circuit for producing the logical control input signals.

14. The brake pressure control system as set forth in claim 13, wherein the logical control input signals produced by the logic circuit create a plurality of conditions including:

one of the third and fourth switching devices is on while the other of the third and fourth switching devices is off; and the fifth switching device is on while the fourth switching device is on and the fifth switching device is off while the fourth switching device is off; and the sixth switching device is on while the third switching device is on and the sixth switching device is off while the third switching device is off.

15. The brake pressure control system as set forth in claim 14, wherein:

the first and second switching devices are transistors;

the third and fifth switching devices are p-type MOSFET's; and the fourth and sixth switching devices are n-type MOSFET's.

16. A method of controlling a cantilever of a solenoid valve using an electrical driver circuit, comprising:

applying a first logical control input signal to a first switching device;

applying a second logical control input signal to a second switching device;

operating a third switching device and a fourth switching device as a function of the state of the first switching device;

operating a fifth switching device and a sixth switching device as a function of the state of the second switching device; and creating voltage potential differences across at least one coil electrically connected between the first, second, third, and fourth switching devices, for controlling a cantilever of the solenoid valve, said voltage potential differences running in either direction across said coil so that either end of said coil may have a higher voltage potential compared to the other end of said coil, or both ends of said coil may have the same voltage potential, as a function of the logical control input signals.

17. The method of controlling a cantilever of a solenoid valve as set forth in claim 16, wherein the creating step includes one of:

creating a positive voltage potential difference across the at least one coil;

creating a negative voltage potential difference across the at least one coil; and creating the positive voltage potential difference across a first of the at least one coils and the negative voltage potential difference across a second of the at least one coils.

* * * * *